Nov. 1, 1938.     H. FÖTTINGER     2,135,282
POWER TRANSMISSION DEVICE
Filed Oct. 1, 1936
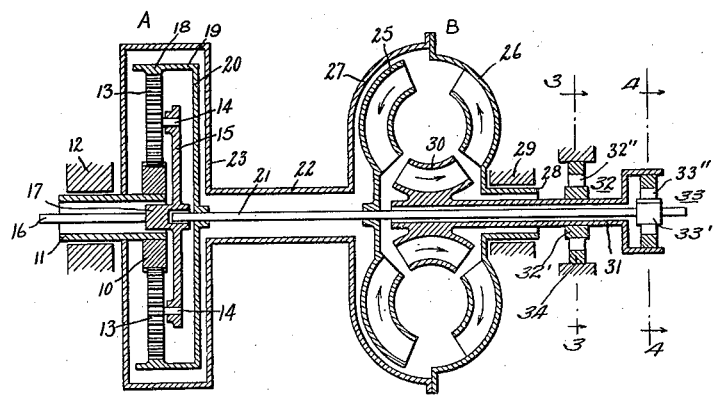
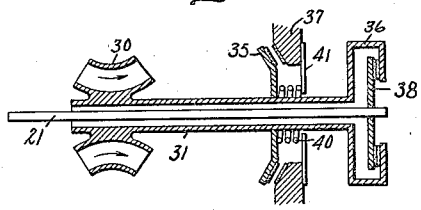
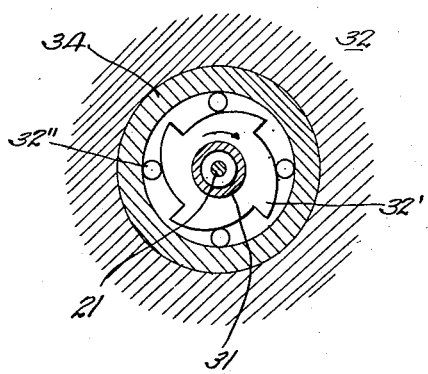
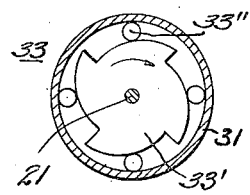
Inventor:
Hermann Föttinger,
by Harry E. Dunham
His Attorney.

Patented Nov. 1, 1938

2,135,282

UNITED STATES PATENT OFFICE 2,135,282

POWER TRANSMISSION DEVICE

Hermann Föttinger, Berlin-Charlottenburg, Germany

Application October 1, 1936, Serial No. 103,599
In Germany October 10, 1935

3 Claims. (Cl. 60—54)

My invention relates to power transmission devices, and more particularly to a power transmission device comprising a mechanical gear train and a hydraulic gear.

An object of my invention is to provide an improved power transmission operable either as a torque transformer or as a slip coupling.

Another object of my invention is to provide a hydraulic power transmission device having a single hydraulic circuit operable selectively either as a torque transformer or as a slip coupling.

Another object of my invention is to provide a hydraulic gear operable as a torque transformer or as a slip coupling wherein the selection is automatically performed in response to fluid conditions within the hydraulic circuit.

For a better understanding of my invention, together with other and further objects thereof, reference is had to the following description, taken in connection with the accompanying drawing, and its scope will be pointed out in the appended claims.

In the accompanying drawing, Fig. 1 illustrates a vertical cross section, partly diagrammatic, of a power transmission device built in accordance with my invention, Fig. 2 is a cross-sectional view of one form of a selection device and Figs. 3 and 4 are sectional views of Fig. 1 looking in the direction of arrows 3—3 and 4—4 respectively.

In Fig. 1 I have illustrated a vertical cross-section of a power transmission including a gear train A and a hydraulic device B. The gear train A comprises a sun gear 10 mounted on a hollow shaft 11 which is rotatable in a bearing 12. Engaging the sun gear 10 are a plurality of planet gears 13 rotatably mounted on shafts 14. The shafts 14 are in turn mounted in a disc 15 which is driven by an input, or drive shaft 16. The drive shaft 16 projects through the shaft 11 and is rotatable relatively thereto. The disc 15 is for this purpose provided with a hub 17, the surface of which comprises a bearing surface which engages the inner wall of the hollow shaft 11. An internal gear 18 surrounds the sun and planet gears, just described, and completes this epicyclic gear train. This internal gear 18 projects from the inner surface of a cylinder 19 which is attached to a disc 20. The disc 20 is rigidly mounted on a shaft 21 to which the movement of the pinions 13 about the axis of the sun gear is transmitted.

The epicyclic gear train above described is connected to the elements of the hydraulic gear, or device, B by means of the shaft 21 and by means of a hollow shaft 22 arranged concentrically with the shaft 21 and is operable by the sun gear 10 to which it is rigidly connected by a casing 23, extending around the gear train, and rigidly connected to the hollow shafts 11 and 22.

The hydraulic gear or transmission device B comprises a casing in which a turbine and pump wheels provided with vanes circulate a fluid in the direction indicated by the arrows and thereby transmit power from one wheel to the other. In the simplest forms of these devices, only two relatively rotating wheels, or sets of vanes are used. Such devices are most efficient as slip couplings wherein the torque difference between the two shafts is relatively low. When a greater torque difference exists between the input and output shafts, a third set of vanes is used which reduces the speed of the driven shaft relativelly to the driving shaft and correspondingly increases the torque exerted on the driven shaft thereby operating as a torque transformer in the manner of a speed reduction gear train. These devices are described in greater detail in my U. S. Patents 1,199,359 and 1,199,360, issued Sept. 26, 1916.

In my present invention I provide a hydraulic device of the above type in which a group of blades mounted upon a wheel is automatically held stationary, thereby forming a stator, during a period of high torque difference, such as exists for example during the starting of an internal combustion engine driven vehicle, and which is permitted to rotate when the torque difference has fallen below a predetermined value, such as exists, for example, when the driven shaft has reached a certain speed. I thereby provide an efficient operation under all torque conditions.

In the device B the turbine wheel 25 is rigidly mounted on the shaft 21 and the pump wheel 26 is connected to the hollow shaft 22 through a casing member 27. The casing member 27 and the pump wheel 26 are joined at their peripheries and together form the casing for the device B. The wheel 26 is provided with a hub 28 which is supported in a bearing 29. The casing thus formed by the wheel 26 and the member 27 is rotatable and is supported in the bearings 12 and 29.

For the purpose of converting the operation of this device from slip coupling operation to torque transforming or speed reducing operation, I provide a third wheel, or stator, 30 mounted upon a hollow shaft 31 which is concentric with the shaft 21 and provide one-way braking and clutching devices 32 and 33 respectively whereby the wheel is held stationary or is connected, or locked, to the shaft 21 for rotation therewith and with the turbine wheel 25.

In Fig. 1 the devices 32 and 33 are diagrammatically shown. They may be of any suitable construction. Their operation is to be such that during periods of high torque difference between the shafts 16 and 21, the brake 32 will engage the shaft 31 and hold it stationary and when the torque difference between the two shafts falls below a predetermined value, the brake 32 will release the shaft 31 and clutch 33 will operate to connect the hollow shaft 31 to the shaft 21 thereby adding the vanes of wheel 30 to the vanes of wheel 25, in effect, prolonging them.

In Figs. 3 and 4 I have shown one form of self-locking, or one-way, brake and clutch mechanisms that may be used. Fig. 3 is a view looking in the direction of the arrows 3—3 in Fig. 1. This one-way brake mechanism is of the ratchet and roller type comprising a ratchet wheel 32' and rollers 32". In operation, when the ratchet wheel 32' rotates clockwise, as indicated by arrows, along with the shaft 31 to which it is rigidly connected, the rollers 32" move into the deep end of the ratchet notches and provide a clearance between themselves and the inner surface of the stationary ring 34. When there is a tendency, however, to rotate counterclockwise, the rollers move out of the deep end of the notches and wedge themselves between the ratchet wheel and the stationary ring 34, thereby holding the shaft 31 and wheel 30 stationary.

In Fig. 4 I have illustrated one form of a one-way clutch mechanism 33, indicated by arrows 4—4 in Fig. 1. This form of the mechanism comprises a ratchet wheel 33' and rollers 33". The ratchet wheel is rigidly attached to the shaft 21 and, when rotated clockwise thereby, permits the rollers to move into the deep end of the ratchet slots and thereby establish a clearance between themselves and the enlarged end of the hollow shaft 31. Any tendency of the shaft 31 to move counter-clockwise relative to the shaft 21 will wedge the rollers between the ratchet wheel and the hollow shaft and thereby lock the two rotating members to each other.

In Fig. 2, I have indicated another form of clutching device which can be operated automatically to hold the wheel 30 either stationary or to connect it to the turbine wheel for rotation therewith. In Fig. 1, I have indicated the direction of flow which is given to the fluid in the hydraulic gear casing due to a difference in speed between the pump wheel and the turbine wheel. The vanes on the pump wheel discharge the fluid into the vanes of the turbine wheel, and the vanes of the turbine wheel discharge the fluid to the vanes on the wheel 30 which redirect the fluid to the vanes on the pump wheel. When great torque differences occur between the drive and the driven shaft, a correspondingly greater speed difference occurs between the turbine and pump wheels and the fluid in the casing is circulated between the two wheels at a greater speed. I make use of this greater speed of the fluid flow by causing it to axially move the wheel 30 and thereby change the clutch connections.

Fig. 2 discloses a cross-sectional view of the wheel 30 mounted on the hollow shaft 31 and provided with two friction members 35 and 36 rigidly attached thereto. A clutch member 37 cooperates with clutch member 35 to hold the shaft 31 stationary and a clutch member 38 cooperates with the clutch member 36 to connect the shaft 31 to the shaft 21 which projects through the hollow shaft 31 and which carries the turbine wheel 25. A spring 40 placed under compression between the clutch member 35 on the shaft 31 and a stationary plate 41 attached to the clutch member 37 urges the shaft 31 to the left, thereby normally causing clutch members 36 and 38 to engage, whereby shafts 21 and 31 rotate together.

During operation, the fluid in the hydraulic casing is circulated as indicated by the arrows and, as stated above, this circulation or flow increases when a large speed difference exists between the turbine and pump wheels.

Such speed difference is the largest during a starting period, during which the drive shaft is moving at a normal or greater than normal speed, and the driven shaft is just beginning to move. The fluid moving in the direction of the arrows exerts a high horizontal moment of force, or pressure, tending to move the wheel 30 to the right. The spring 40 can be made of such strength that this horizontal force overcomes the force of the spring during this starting period and thereby moves the wheel 30 and shaft 31 to the right. This movement disengages the clutch members 36 and 38 and engages the clutch members 35 and 37. The shaft 31 and wheel 30 are thus held stationary until the spring 40 overcomes the force of the fluid and moves the shaft to its original position.

From the foregoing description, it will be evident that I have provided a power transmission device wherein power is transmitted to a driven member, or shaft, through two channels, one channel being a mechanical transmission through the planet gears and the internal gear and the other from the sun gear through the hydraulic gear. In terms of the above description, the driving shaft 16 is the source of power through the disk 15 and the planet gears 13 transmit power to the sun gear 10 and to the ring gear 18. The ring gear 18 is connected directly to the driven shaft through the cylinder 19 and disk 20, and thereby completes a direct mechanical connection from the driving to the driven shaft. The planet gears 13, however, are rotatable about their respective axes or shafts 14, and thereby any force transmitted from the disk 15 to the ring gear 18 is balanced against the torque of the sun gear 10, which is connected through casing 23, hollow shaft 22, casing 27 to the pump wheel 26 of the hydraulic device B. The pump wheel sets into motion the fluid, in the hydraulic device, which impinges upon the turbine wheel 25. The turbine wheel being attached to shaft 21 rotates with it at a correspondingly slower speed until the energy imparted to it by the circulating fluid increases this speed and the torque on the driven shaft is reduced to normal. The hydraulic gear is developed as a single circuit device which will operate automatically as a slip coupling or as a torque transformer and speed reduction device. This change from one operation to another is effected automatically in response to a fluid condition, that is, the pressure resulting from the circulation of the fluid in the hydraulic device itself. The whole transmission thereby adapts itself to the torque conditions existing between the driving and driven members and the change over from one type of operation to another takes place, in each case, at the proper time. Furthermore due to this transmission of power over the two generators, the power transmitted through the hydraulic device is only a fraction of the whole power, and consequently, the losses incurred are only a portion of the losses that would be incurred should the total power be transmitted through the hydraulic device, and thereby a considerable increase in efficiency is obtained.

What I claim as new and desire to secure by Letters Patent of the United States is:

1. In a power transmission device, the combination of an epicyclic gear train comprising a sun gear, planet gears engaging said sun gears, and a ring gear engaging said planet gears, a hydraulic gear including a driving wheel, a driven wheel and an intermediate wheel, said driving and driven wheels being connected respectively to the sun gear and ring gear of said gear train, means for normally locking said intermediate wheel to said driven shaft, and means responsive to a predetermined fluid pressure in said hydraulic device for holding said intermediate wheel stationary.

2. In a power transmission device, the combination of a driving shaft, a driven shaft, an epicyclic gear train including a sun gear attached to said driving shaft, a plurality of planet gears engaging said sun gear, and a ring gear surrounding and engaging said planet gears, a hydraulic gear provided with a pump wheel and a turbine wheel connected respectively to said sun gear and said ring gear, a fluid circulating between said wheels in response to relative rotation between said pump and turbine wheels, an intermediate wheel between said pump and turbine wheels, means for normally connecting said intermediate wheel to rotate with said turbine wheel, and means responsive to a predetermined fluid pressure in said hydraulic device for holding said intermediate wheel stationary.

3. In a power transmission device, the combination of an epicyclic gear train comprising a sun gear, planet gears engaging said sun gears, and a ring gear engaging said planet gears, a hydraulic gear including a driving wheel, a driven wheel and an intermediate wheel, said driving and driven wheels being connected respectively to the sun gear and ring gear of said gear train, a one-way clutch arranged to normally lock said intermediate wheel to said driven shaft, a one-way brake normally open but operable to hold said intermediate wheel stationary, and means responsive to a predetermined fluid pressure in said hydraulic device for opening said clutch and closing said brake to hold said intermediate wheel stationary.

HERMANN FÖTTINGER.